United States Patent
Hsu et al.

(10) Patent No.: US 9,817,936 B2
(45) Date of Patent: Nov. 14, 2017

(54) METHODS FOR MINIMIZING LAYOUT AREA OF IC

(71) Applicant: MediaTek Inc., Hsin-Chu (TW)

(72) Inventors: Chin-Hsiung Hsu, Taoyuan (TW); Chun-Chih Yang, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 215 days.

(21) Appl. No.: 14/741,771

(22) Filed: Jun. 17, 2015

(65) Prior Publication Data

US 2016/0171145 A1   Jun. 16, 2016

Related U.S. Application Data

(60) Provisional application No. 62/091,714, filed on Dec. 15, 2014.

(51) Int. Cl.
*G06F 17/50* (2006.01)

(52) U.S. Cl.
CPC ...... *G06F 17/5072* (2013.01); *G06F 17/5077* (2013.01); *G06F 2217/08* (2013.01)

(58) Field of Classification Search
CPC .............................. G06F 17/5077; G06F 17/08
USPC .......................................................... 716/124
See application file for complete search history.

(56) References Cited

U.S. PATENT DOCUMENTS

| | | | |
|---|---|---|---|
| 2005/0273748 A1* | 12/2005 | Hetzel et al. | 716/14 |
| 2007/0256045 A1* | 11/2007 | Lin et al. | 716/13 |
| 2013/0283226 A1* | 10/2013 | Ho | G06F 17/5072 716/122 |

* cited by examiner

*Primary Examiner* — Suchin Parihar
(74) *Attorney, Agent, or Firm* — McClure, Qualey & Rodack, LLP

(57) ABSTRACT

A method for minimizing layout area of IC is provided. A plurality of first tiles of an initial floor plan are obtained according to a plurality of partitions and channels of the initial floor plan. Each first tile between the partition and the channel has a fixed tile property being the partition or the channel. Each second tile between at least one of the partitions and at least one of the channels has a changeable tile property which can be changed between the at least one partition and the at least one channel. A specific area path of the layout area is obtained according to the partitions, the channels and the routing densities corresponding to the channels. The changeable tile properties of the second tiles are changed according to the specific area path, to re-shape the partitions and re-route the nets within the channels.

26 Claims, 7 Drawing Sheets

METHODS FOR MINIMIZING LAYOUT AREA OF IC

CROSS REFERENCE TO RELATED APPLICATIONS

This Application claims priority of U.S. Provisional Application No. 62/091,714, filed on Dec. 15, 2014, the entirety of which is incorporated by reference herein.

BACKGROUND OF THE INVENTION

Field of the Invention

The invention relates to a method for minimizing a layout area of an integrated circuit (IC), and more particularly to a method for minimizing a layout area of an IC to co-optimize channel routing and partition re-shaping.

Description of the Related Art

In recent years, the developing process of integrated circuits (ICs) such as super larger scale integrated circuits (LSIs) generally utilizes computer assisted design (CAD). According to such a developing process based on CAD, abstract circuit data, which corresponds to functions of an integrated circuit to be developed, is defined by using a so-called hardware description language (HDL), and the defined circuit is used to form a concrete circuit structure to be mounted on a chip.

Before the IC chips are manufactured (or implemented), the floor plans and the layout areas of the IC chips are considered first so as to determine a die size of each IC chip. In general, the die size will affect the manufacturing cost for the IC chip. Therefore, it is desirable to optimize the floor plan of an IC chip for minimizing the layout area of the IC chip.

BRIEF SUMMARY OF THE INVENTION

Methods for minimizing a layout area of an integrated circuit and a non-transitory computer-readable storage medium storing instructions are provided. An embodiment of a method for minimizing a layout area of an integrated circuit is provided. An initial floor plan of the integrated circuit is obtained and displayed, wherein the initial floor plan comprises a plurality of partitions and a plurality of channels. A plurality of first tiles of the initial floor plan are obtained according to the partitions and the channels, wherein each of the first tiles between the partition and the channel has a fixed tile property being the partition or the channel. A plurality of second tiles around a plurality of edges between at least one of the partitions and at least one of the channels are obtained, wherein each of the second tiles has a changeable tile property which can be changed between the at least one partition and the at least one channel. A specific area path of the layout area is obtained according to the partitions, the channels and a plurality of routing densities corresponding to the channels. The changeable tile properties of the second tiles are changed according to the specific area path, to re-shape the partitions and re-route a plurality of nets within the channels.

Furthermore, another embodiment of a method for minimizing a layout area of an integrated circuit is provided. An initial floor plan of the integrated circuit is obtained and displayed, wherein the initial floor plan comprises a plurality of partitions and a plurality of channels. A plurality of nets are routed within the channels between the partitions via a plurality of first tiles so as to obtain a routing density of the nets within each of the channels. A specific area path of the layout area is obtained according to the partitions, the channels and the corresponding routing densities. A flexible space of each of the channels is obtained according to the channels and the corresponding routing densities. The partitions are re-shaped and the nets are re-routed within the channels by using a plurality of second tiles around a plurality of edges between at least one of the partitions and at least one of the channels according to the flexible spaces. A final floor plan is displayed according to the re-shaped partitions. Each of the first tiles between the partition and the channel has a fixed tile property being the partition or the channel, and each of the second tiles has a changeable tile property which can be changed between of the at least one partition and the at least one channel.

Moreover, an embodiment of a non-transitory computer-readable storage medium storing instructions that, when executed by a computer, cause the computer to perform a method for minimizing a layout area of an integrated circuit. An initial floor plan of the integrated circuit is obtained and displayed, wherein the initial floor plan comprises a plurality of partitions and a plurality of channels. A plurality of first tiles of the initial floor plan are obtained according to the partitions and the channels, wherein each of the first tiles between the partition and the channel has a fixed tile property being the partition or the channel. A plurality of second tiles are obtained around a plurality of edges between at least one of the partitions and at least one of the channels, wherein each of the second tiles has a changeable tile property which can be changed between the at least one partition and the at least one channel. A specific area path of the layout area is obtained according to the partitions, the channels and a plurality of routing densities corresponding to the channels. The changeable tile properties of the second tiles are changed according to the specific area path, to re-shape the partitions and re-route a plurality of nets within the channels.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
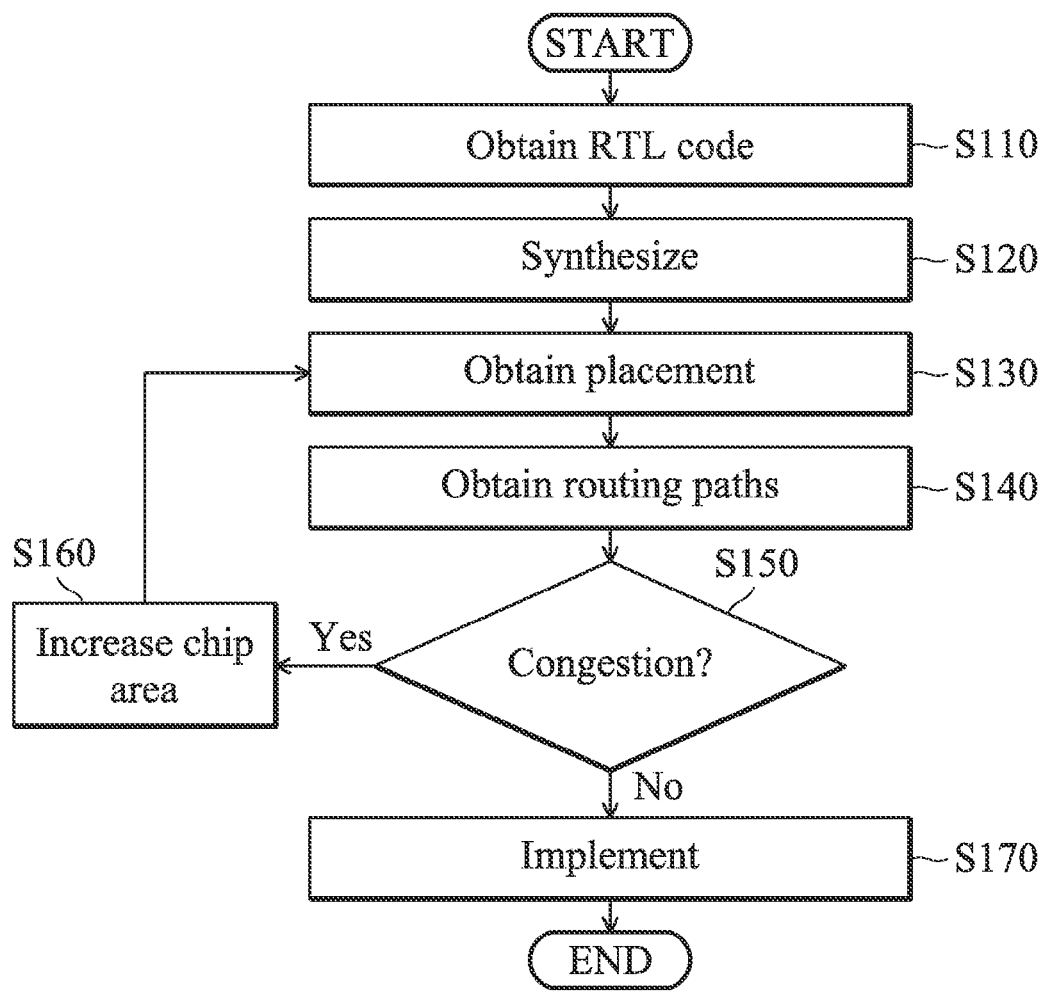
FIG. 1 shows a flow chart illustrating a typical hierarchical design process of an integrated circuit (IC)

FIG. 1 shows a flow chart illustrating a typical hierarchical design process of an integrated circuit (IC). First, in step S110, a register-transfer-level (RTL) code describing the function performed by the IC is obtained. Next, in step S120, the RTL code is synthesized to generate gates for the IC. Next, in step S130, a placement procedure is performed to generate a placement of the gates within a chip area of the IC. Next, the routing paths are obtained according to the placement (step S140), and then it is checked whether there is any congestion in the placement according to the routing paths (step S150). If there is no congestion, the IC is implemented according to the placement and routing paths (step S170). If there is congestion, the chip area of the IC must be increased to handle the congestion (step S160), and then the automatic place and route (APR) procedure is performed again (steps S130 and S140) so as to generate a new placement of the gates with corresponding routing paths within the increased chip area of the IC.

Figure 2:
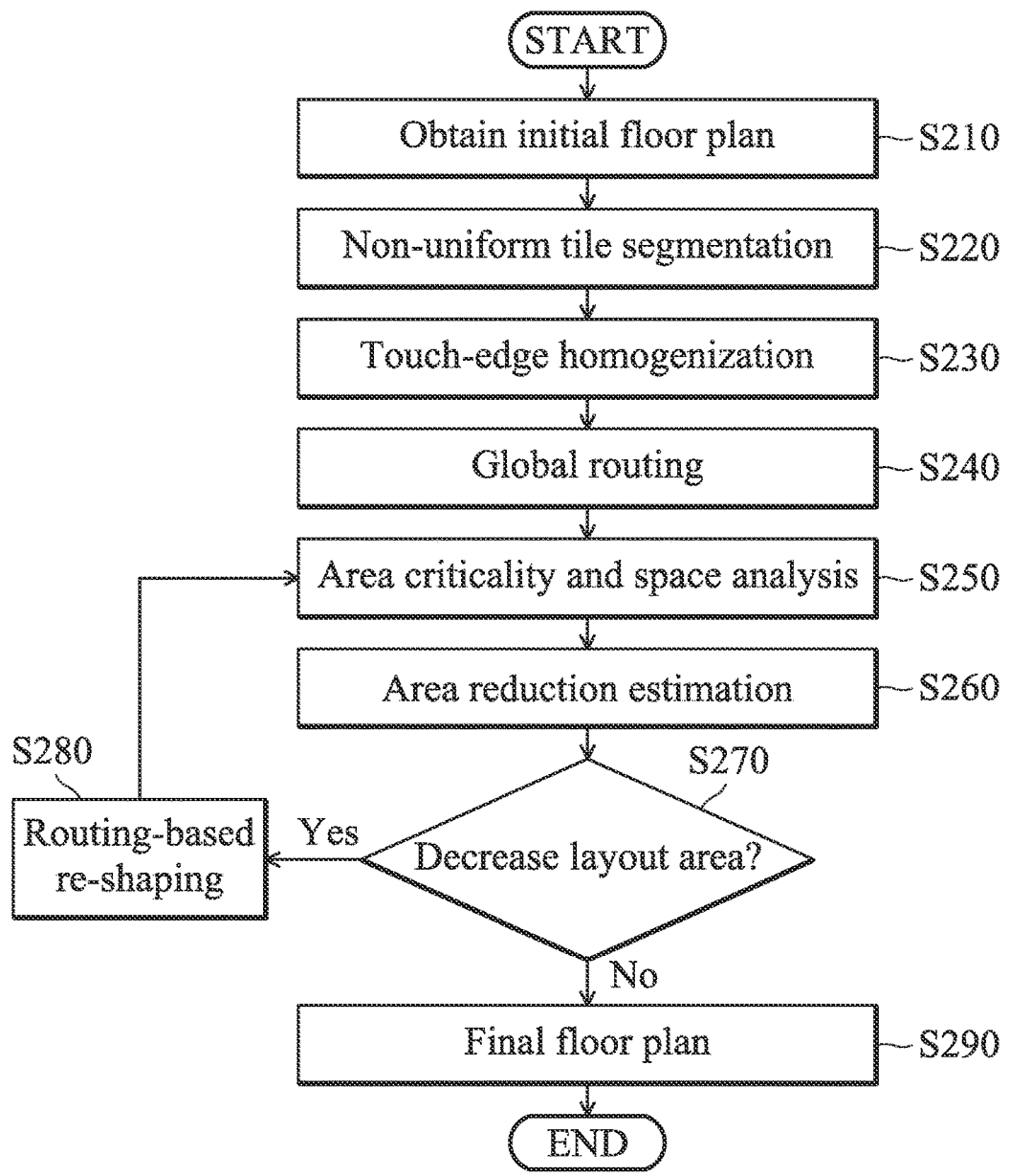
FIG. 2 shows a method for minimizing a layout area of an IC according to an embodiment of the invention, wherein the method of FIG. 2 is performed by a computer capable of operating an electronic design automation (EDA) tool.
Figure 3:
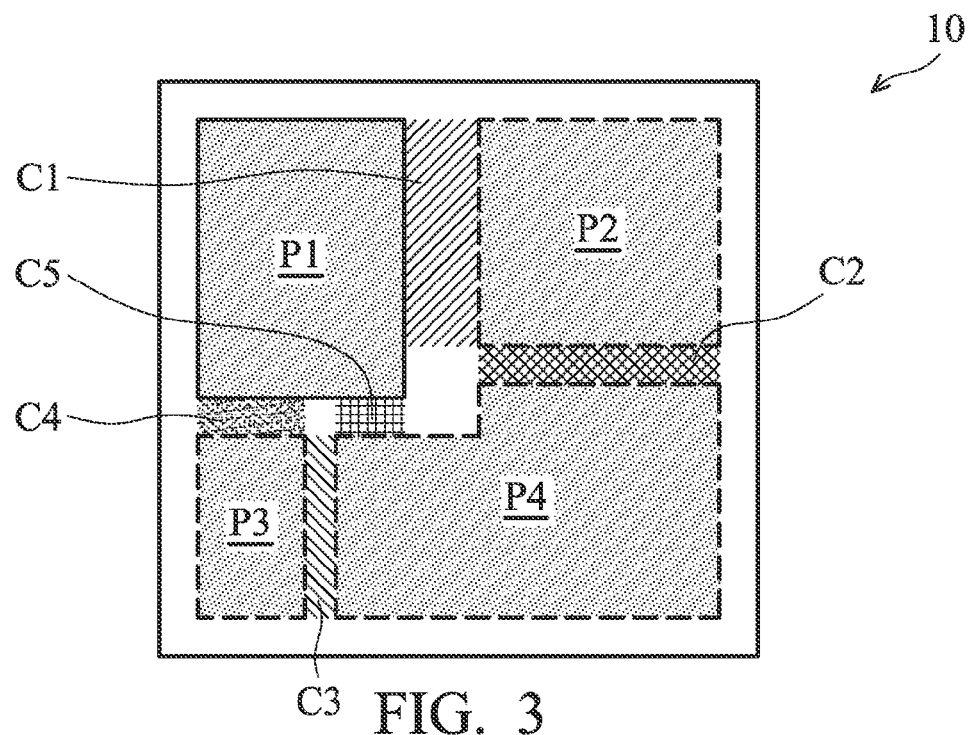
FIG. 3 shows an example of an initial floor plan according to step S210 of FIG. 2.
Figure 4:
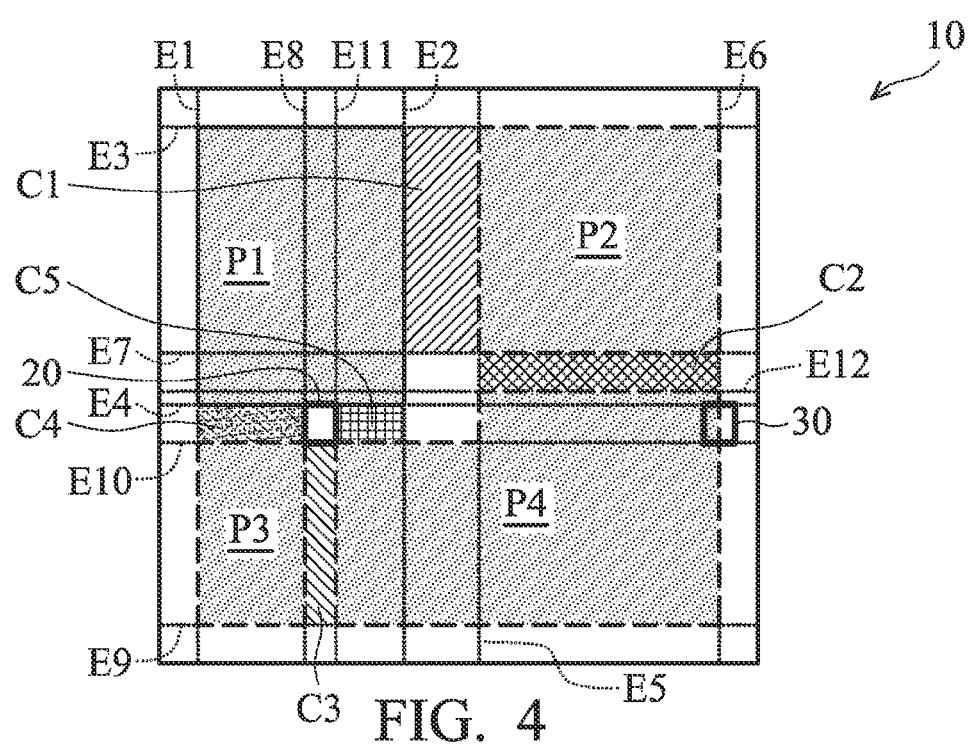
FIG. 4 shows an example of a tile and an edge of the initial floor plan according to step S220 of FIG. 2.

FIG. 2 shows a method for minimizing a layout area of an IC according to an embodiment of the invention, wherein the method of FIG. 2 is performed by a computer capable of operating an electronic design automation (EDA) tool. First, in step S210, a processor of the computer obtains an initial floor plan corresponding to the layout area of the IC, and the initial floor plan can be displayed in a graphical user interface (GUI). FIG. 3 shows an example illustrating an initial floor plan 10 according to step S210 of FIG. 2. The floor plan 10 comprises a plurality of partitions P1-P4 and a plurality of channels C1-C5. In the embodiment, the partition P1 is a hard partition having a fixed shape that cannot be modified, and the partitions P2-P4 are the soft partitions that are movable and deformable. In general, each of channels C1-C5 represents routing resources that exist between the adjacent partitions. For example, the channel C1 is used to route the nets (or wires) in the horizontal direction between the partitions P1 and P2, and the channel C3 is used to route the nets in the horizontal direction between the partitions P3 and P4. Likewise, the channel C2 is used to route the nets in the vertical direction between the partitions P2 and P4, the channel C4 is used to route the nets in the vertical direction between the partitions P1 and P3, and the channel C5 is used to route the nets in the vertical direction between the partitions P1 and P4. As illustrated in FIG. 2, subsequent to step S210, the processor performs a non-uniform tile segmentation procedure on the initial floor plan (step S220) so as to obtain a plurality of tiles and a plurality of edges according to a global routing graph of the initial floor plan. FIG. 4 shows an example of a tile 20 and an edge 30 of the initial floor plan 10 according to step S220 of FIG. 2. In FIG. 4, the shape of the partition P1 is formed by the lines E1-E4, the shape of the partition P2 is formed by the lines E3 and E5-E7. Furthermore, the shape of the partition P3 is formed by the lines E1 and E8-E10, and the partition P4 is formed by the lines E5, E6, E9 and E12. In the embodiment, the tile 20 is located at a range formed by the lines E4, E8, and E10-E11, which is used to assign the pins and connect pins of each net in the global routing graph. The edge 30 is located at a range formed by the lines E4 and E10 and has a center line corresponding to the line E6, wherein the edge 30 is a global edge for modelling the relationship between the adjacent tiles. For the initial floor plan 10, a real global edge is located outside a partition (i.e. inside a channel), and the real global edge corresponds to a plurality of tiles having a fixed tile property being the channel. Furthermore, a virtual global edge is located inside a partition, and the virtual global edge corresponds to a plurality of tiles having a fixed tile property being the partition. In general, when the routing demand of the real global edge exceeds a given capacity, an overflow occurs in the real global edge.

Figure 5:
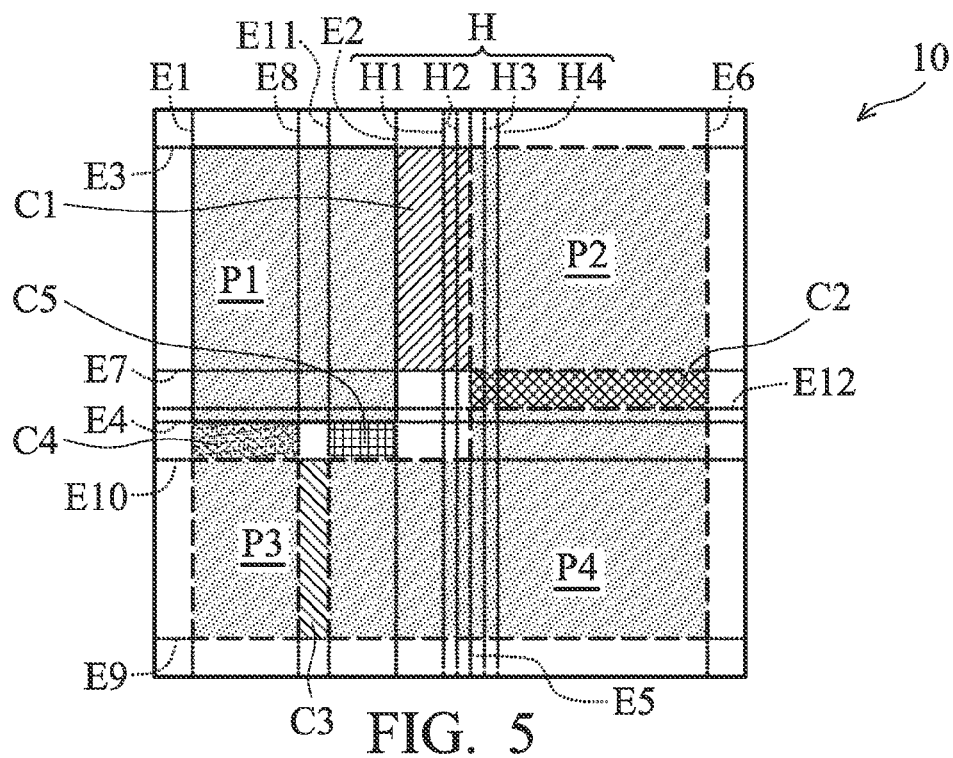
FIG. 5 shows an example of the homogenized tiles of the initial floor plan according to step S230 of FIG. 2.

As illustrated in FIG. 2, subsequent to step S220, the processor performs a touch-edge homogenization procedure on the initial floor plan (step S230) so as to obtain a plurality of homogenized tiles in the initial floor plan. The homogenized tiles are located around a plurality of touch edges. Each touch edge is located at a boundary between a partition and a channel (e.g. the edge 30 of FIG. 4), and each homogenized tile has a changeable tile property which can be changed between the partition and the channel. FIG. 5 shows an example of the homogenized tiles of the initial floor plan 10 according to step S230 of FIG. 2. In FIG. 5, the homogenized tiles are located at a homogenized range H, wherein the homogenized range H comprises the lines H1-H4. Furthermore, a center line of the homogenized range H is the line E5 that is a boundary between the partition P2 and the channel C1. The tile property of each homogenized tile located at the homogenized H is changeable. In the embodiment, the lines H1 and H2 are located at the channel C1, and the lines H3 and H4 are located at the partition P2. In the line H1 or H2, the homogenized tiles located between the partition P2 and the channel C1 have the changeable tile properties being the channel C1, wherein the changeable tile properties can be changed from the channel C1 to the partition P2. Furthermore, in the line H3 or H4, the homogenized tiles between the partition P2 and the channel C1 have the changeable tile properties being the partition P2, wherein the changeable tile properties can be changed from the partition P2 to the channel C1.

Figure 6:
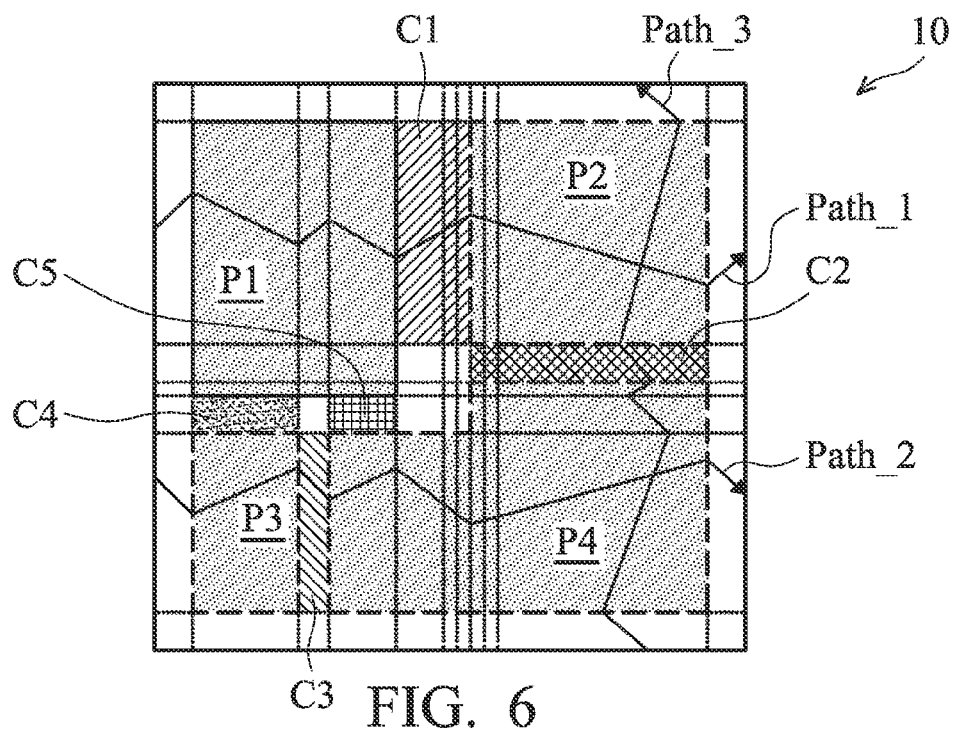
FIG. 6 shows an example of the area paths of the initial floor plan according to step S250 of FIG. 2.

As illustrated in FIG. 2, subsequent to step S230, the processor performs a global routing procedure on the initial floor plan (step S240) so as to route the nets within the channels C1-C5. Next, in step S250, the processor performs an area criticality and space analysis procedure on the routed nets within the channels C1-C5 so as to obtain the routing densities of the nets within each channel. In one embodiment, the routing density of each channel is determined according to the demand value and the capacity value of the channel, wherein the demand value represents the number of nets that are expected to be routed via the channel, and the capacity value represents the number of nets that can be routed via the channel. According to the partitions P1-P4, and the channels C1-C5 and the routing densities thereof, the processor obtains the path lengths of the area paths within the layout area corresponding to the initial floor plan, and determines whether a critical path with a maximum path length exists among the path lengths, wherein the maximum path length exceeds a chip size of the integrated circuit corresponding to the layout area. Furthermore, the processor further obtains the flexible space of each channel so as to determine whether the channel is utilized completely. FIG. 6 shows an example of the area paths of the initial floor plan 10 according to step S250 of FIG. 2. In FIG. 6, an area path Path_1 is obtained from the left side to the right side of the initial floor plan 10 via the partition P1, the channel C1, and the partition P2 in sequence, and the path length of the area path Path_1 is calculated. Furthermore, an area path Path_2 is obtained from the left side to the right side of the initial floor plan 10 via the partition P3, the channel C3, and the partition P4 in sequence, and the path length of the area path Path_2 is calculated. An area path Path_3 is calculated from the bottom side to the top side of the initial floor plan 10 via the partition P4, the channel C2, and the partition P2 in sequence, and the path length of the area path Path_3 is calculated. In one embodiment, the path length of each area path is obtained by adding the lengths of the channels multiplied by the corresponding routing densities and the lengths of the partitions that the area path crosses. For example, the path length of the area path Path_1 is obtained by adding the channel C1 multiplied by the corresponding routing density and the partitions P1 and P2, i.e. (P1+P2)+ (C1*routing density). Simultaneously, the processor will calculate the flexible space of each channel so as to determine whether the channel is utilized completely or not. In one embodiment, the flexible space of the channel is obtained according to the channel and the corresponding routing density. For example, the flexible space of the channel C1 is obtained according to the following equation: C1*(1−routing density). In FIG. 6, according to the flexible spaces of the channels C1-C5, the processor can determine that the channel C3 is a congested channel among the channels C1-C5. According to the area path lengths and the flexible spaces, the processor will further determine how to minimize the chip area of the IC by reducing the maximum path length of the critical area path or improving channel utilization.

Figure 7:
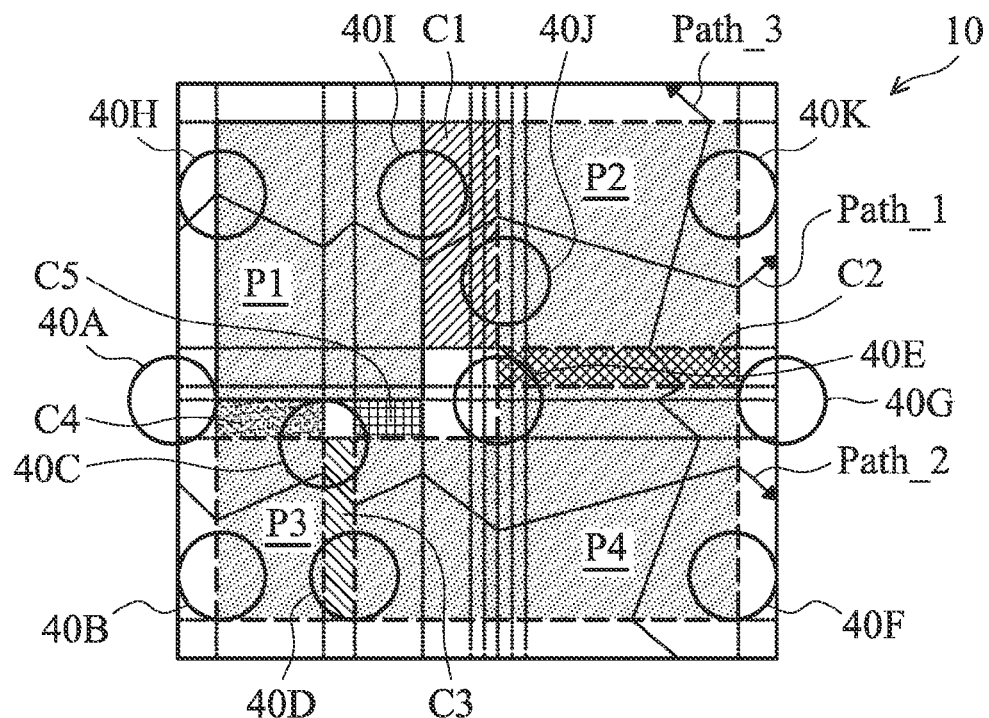
FIG. 7 and FIG. 8 show an example of the horizontal constraint graph according to step S260 of FIG. 2.
Figure 8:
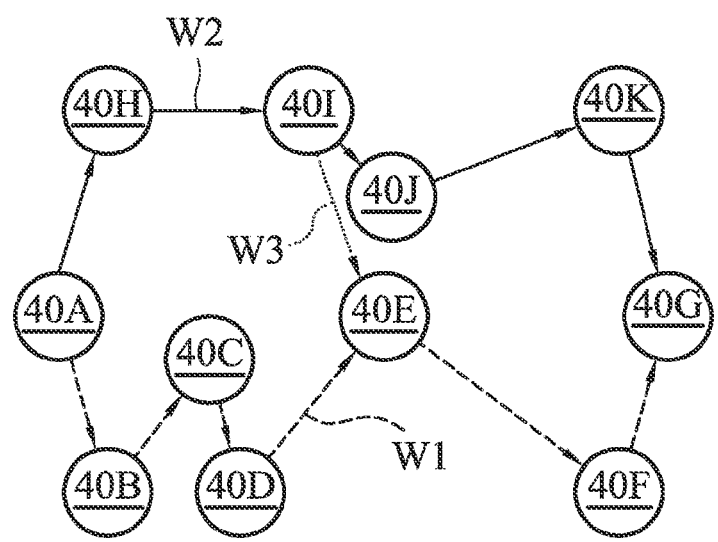

As illustrated in FIG. 2, subsequent to step S250, the processor performs an area reduction estimation procedure on the initial floor plan (step S260). First, according to the constraints corresponding to the area paths and the flexible spaces, the processor will establish at least one horizontal constraint graph and/or at least one vertical constraint graph according to the edges of the partitions. Then, the processor will perform a linear programming procedure according to the constraint graphs. FIG. 7 and FIG. 8 show an example of the horizontal constraint graph according to step S260 of FIG. 2. In FIG. 7, label 40A represents the edge at the left side of the floor plan 10, and label 40G represents the edge at the right side of the floor plan 10. Furthermore, the label 40B represents the edge at the left boundary of the partition P3, and the label 40C represents the edge at the right boundary of the partition P3 (i.e. between the partition P3 and the channel C3). Label 40D represents the edge at the left boundary of the partition P4 (i.e. between the partition P4 and the channel C3), label 40E represents the edge at the upper left boundary of the partition P4, and label 40F represents the edge at the right boundary of the partition P4. Moreover, label 40H represents the edge at the left boundary of the partition P1, and label 40I represents the edge at the right boundary of the partition P1 (i.e. between the partition P1 and the channel C1). Label 40J represents the edge at the left boundary of the partition P2 (i.e. between the partition P2 and the channel C1), and label 40K represents the edge at the right boundary of the partition P2. In FIG. 8, according to the constraints corresponding to the area paths and the flexible spaces obtained in step S250 of FIG. 2, the processor establishes the horizontal constraint graph comprising a plurality of ways. In the embodiment, a first way W1 is formed from the edge 40A to the edge 40G through the edges 40B, 40C, 40D, 40E, 40F in sequence. A second way W2 is formed from the edge 40A to the edge 40G through the edges 40H, 40I, 40J and 40K in sequence. A third way W3 is formed from the edge 40A to the edge 40G through the edges 40H, 40I, 40E and 40F in sequence.

Figure 9:
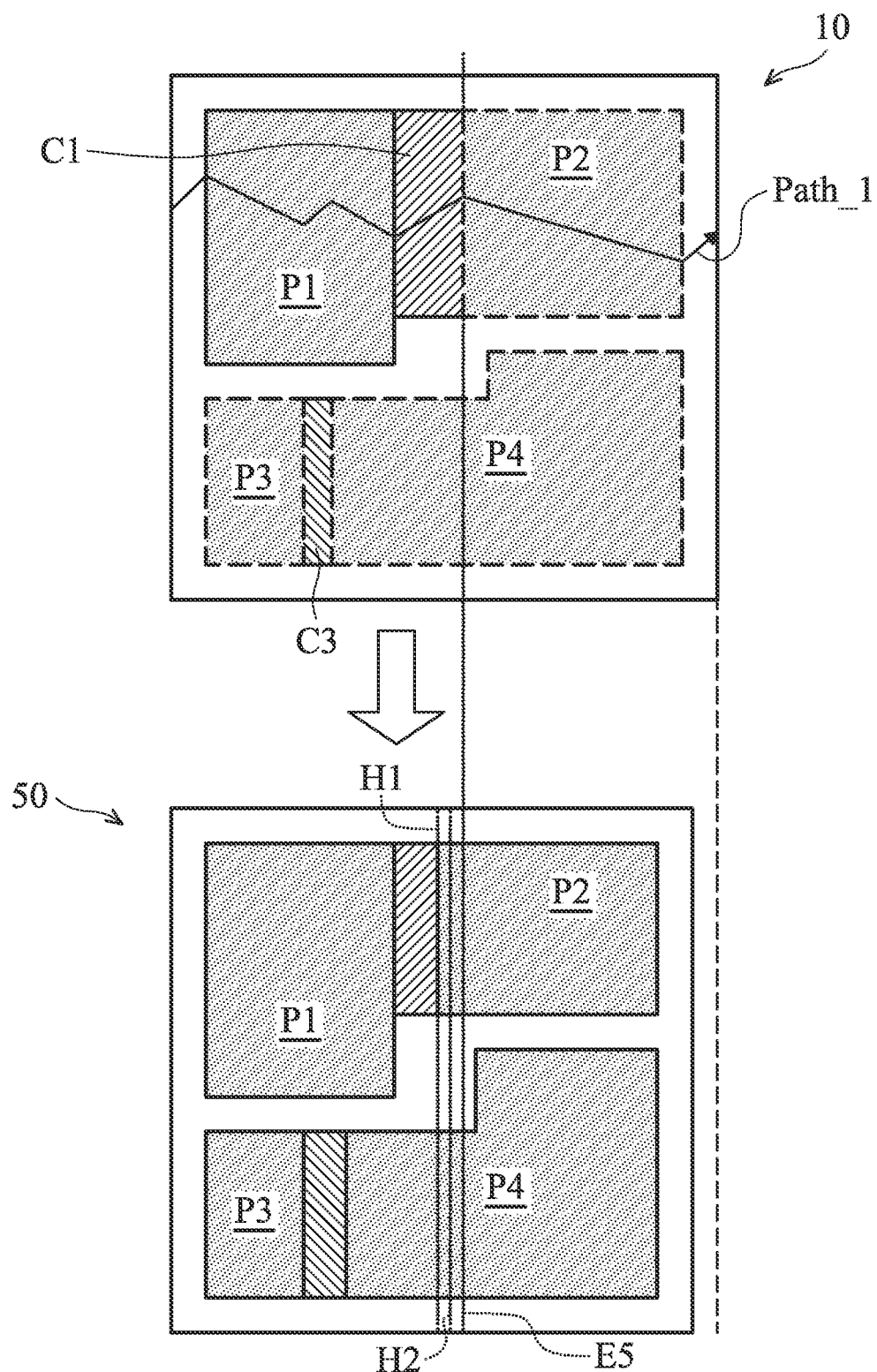
FIG. 9 shows an example of a re-shaped floor plan according to step S280 of FIG. 2.

As illustrated in FIG. 2, subsequent to step S260, the processor can provide the constraints for exchange of equal values (e.g. equivalent width, height and partition's area) according to the horizontal constraint graphs (e.g. the ways W1-W3 in the horizontal constraint graph) and the vertical constraint graphs so as to determine whether the layout area of the IC can be decreased (step S270). If it is determined that the layout area of the IC cannot be decreased, the processor will obtain the final floor plan according to the layout area (step S290), and performs the subsequent procedures according to the final floor plan so as to implement the IC. If it is determined that the layout area of the IC can be decreased, the processor perform a routing-based re-shaping procedure (step S280) to minimize the layout area. In the routing-based re-shaping procedure, the processor changes the changeable tile properties of the homogenized tiles in response to the area reduction estimation. Simultaneously, the processor re-routes the nets and re-shapes the partitions according to the changed homogenized tiles so as to minimize the layout area of the IC and obtain a re-shaped floor plan. FIG. 9 shows an example of a re-shaped floor plan 50 according to step S280 of FIG. 2. In FIG. 9, assumed that the area path Path_1 is the critical area path and the channel C3 is the congested channel, the processor determines that the flexible space of the channel C1 has enough space to minimize the longest area path Path_1. In the embodiment, the processor will change the changeable tile properties of the homogenized tiles at the lines H1 and H2 of the homogenized range H from the channel C1 to the partition P2. Simultaneously, the processor will re-shape the partitions P2, P3 and P4 to obtain the re-shaped floor plan 50 with a decreased layout area, i.e. the layout are of the initial floor plan 10 is greater than that of the re-shaped floor plan 50. Thus, the channels C1-C5 are also modified, for example, the channel C1 is narrowed and the channel C3 is widened in the re-shaped floor plan 50. For example, according to the changed homogenized tiles at the lines H1 and H2, the processor widens the partition P2 along a direction orthogonal to the line E5, and re-route the nets on the channel C1 so as to avoid the nets passing through the changed homogenized tiles, i.e. the channel C1 is narrowed. Conversely, if the processor changes the changeable tile properties of the homogenized tiles at the lines H3 and H4 of the homogenized range H from the partition P2 to the channel C1, the processor will narrow the partition P2 along a direction orthogonal to the line E5, and re-route the nets on the channel C1 so as to increase the nets passing through the changed homogenized tiles, i.e. the channel C1 is widened.

Figure 10:
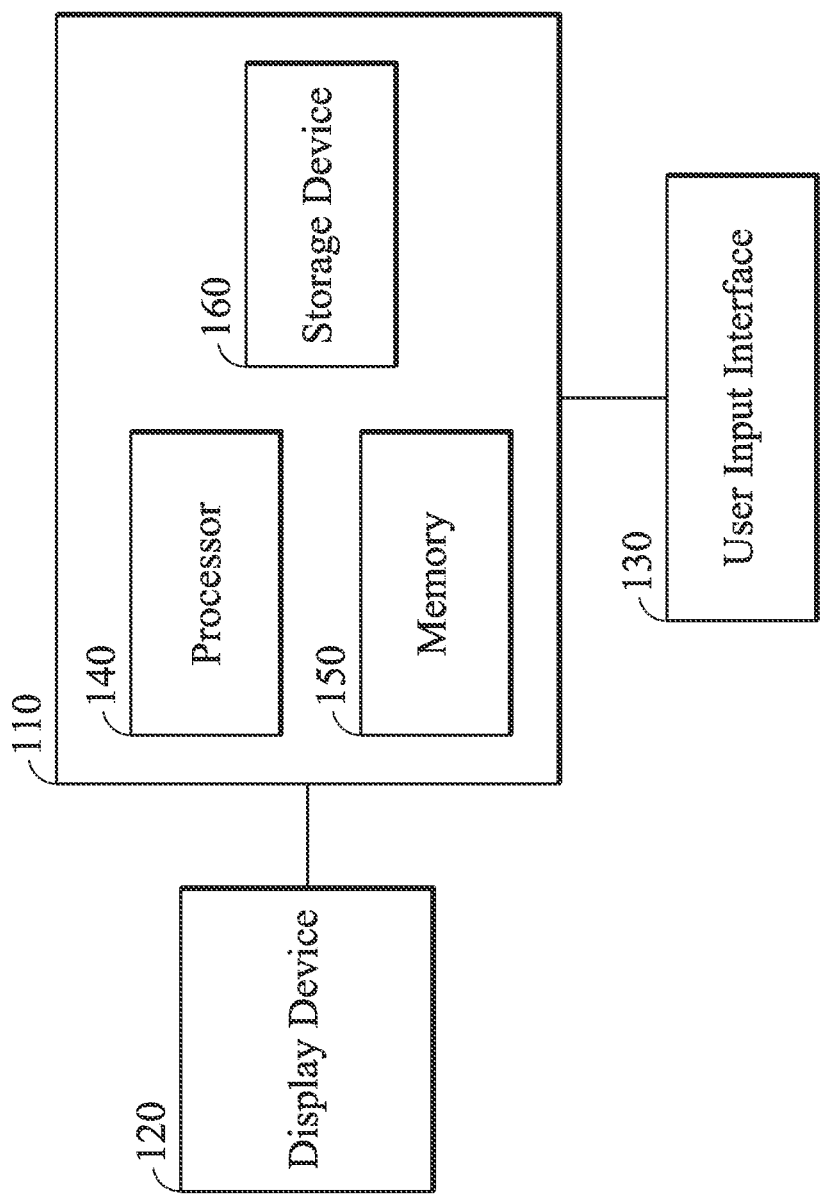
FIG. 10 shows a computer system according to an embodiment of the invention.

FIG. 10 shows a computer system 100 according to an embodiment of the invention. The computer system 100 comprises a computer 110, a display device 120 and a user input interface 130, wherein the computer 110 comprises a processor 140, a memory 150, and a storage device 160. The computer 110 is coupled to the display device 120 and the user input interface 130, wherein the computer 110 is capable of operating an electronic design automation (EDA) tool. Furthermore, the computer 110 is capable of receiving input instruction from the user input interface 130 and displaying the floor plan of the IC on the display device 120. In one embodiment, the display device 120 is a GUI for the computer 110. Furthermore, the display device 120 and the user input interface 130 can be implemented in the computer 110. The user input interface 130 may be a keyboard, a mouse and so on. In the computer 110, the storage device 160 can store the operating systems (OSs), applications, and data that comprising input required by the applications and/or output generated by applications. The processor 140 of the computer 110 can perform one or more operations (either automatically or with user input) in any method that is implicitly or explicitly described in this disclosure. For example, during operation, the processor 140 can load the applications of the storage device 160 into the memory 150, and then the applications can be used by a user to create, view, and/or edit a floor plan for a circuit design.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a computer-readable storage medium or device, so that when a computer system reads and executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for minimizing a layout area of an integrated circuit, comprising:
   obtaining and displaying an initial floor plan of the integrated circuit, wherein the initial floor plan comprises a plurality of partitions and a plurality of channels;
   obtaining a plurality of first tiles of the initial floor plan according to the partitions and the channels, wherein each of the first tiles between the partition and the channel has a fixed tile property being the partition or the channel;
   obtaining a plurality of second tiles around a plurality of edges between at least one of the partitions and at least one of the channels, wherein each of the second tiles has a changeable tile property which can be changed between the at least one partition and the at least one channel;
   obtaining a specific area path from a first side to a second side of the initial floor plan according to the partitions, the channels and a plurality of routing densities corresponding to the channels, wherein the second side is opposite to the first side;
   changing the changeable tile properties of the second tiles according to the specific area path, to re-shape the partitions and re-route a plurality of nets within the channels;
   obtaining a final floor plan according to the re-shaped partitions; and
   fabricating the integrated circuit according to a placement of the final floor plan and the re-routed nets,
   wherein a distance between the first and second sides of the initial floor plan is greater than a distance between the first and side of the final floor plan.

2. The method as claimed in claim 1, wherein the step of changing the changeable tile properties of the second tiles according to the specific area path further comprises:
   changing the changeable tile properties of the second tiles from the at least one channel to the at least one partition, to widen the at least one partition along a specific direction, and re-route the nets on the at least one channel so as to avoid the nets passing through the second tiles; and
   changing the changeable tile properties of the second tiles from the at least one partition to the at least one channel, to narrow the at least one partition along the specific direction and re-route the nets on the at least one channel so as to increase the nets passing through the second tiles,
   wherein the specific direction is orthogonal to a boundary between the at least one partition and the at least one channel.

3. The method as claimed in claim 1, wherein the second tiles are arranged in a specific range between the at least one partition and the at least one channel, and a center line of the specific range is a boundary between the at least one partition and the at least one channel.

4. The method as claimed in claim 1, further comprising:
   routing the nets within the channels between the partitions via the first tiles so as to obtain each of the routing densities of the nets within each of the channels.

5. The method as claimed in claim 1, wherein the step of obtaining the specific area path according to the partitions, the channels and the routing densities corresponding to the channels further comprises:
   obtaining a plurality of path lengths of a plurality of area paths in the layout area according to the partitions, the channels and the routing densities; and
   obtaining the specific area path with a maximum path length among the path lengths of the area paths.

6. The method as claimed in claim 5, wherein the path length of each of the area paths is obtained by adding lengths of the channels multiplied by the corresponding routing densities and lengths of the partitions that the area path crosses.

7. The method as claimed in claim 5, wherein the maximum path length exceeds a chip size of the integrated circuit.

8. The method as claimed in claim 1, further comprising:
   calculating flexible space according to the channels and the corresponding routing densities; and
   displaying the final floor plan according to the re-shaped partitions.

9. The method as claimed in claim 1, further comprising:
   establishing a horizontal constraint graph and a vertical constraint graph according to a plurality of edges between the partitions and channels so as to determine whether to change the changeable tile properties of the second tiles.

10. The method as claimed in claim 1, wherein the partitions comprise at least one hard partition with a fixed shape and a plurality of soft partitions, wherein the soft partitions are movable and deformable, and the at least one partition is one of the soft partitions.

11. A method for minimizing a layout area of an integrated circuit, comprising:

obtaining and displaying an initial floor plan of the integrated circuit, wherein the initial floor plan comprises a plurality of partitions and a plurality of channels;

routing a plurality of nets within the channels between the partitions via a plurality of first tiles so as to obtain a routing density of the nets within each of the channels;

obtaining a specific area path from a first side to a second side of the initial floor plan according to the partitions, the channels and the corresponding routing densities, wherein the second side is opposite to the first side;

obtaining a flexible space of each of the channels according to the channels and the corresponding routing densities;

re-shaping the partitions and re-routing the nets within the channels by using a plurality of second tiles around a plurality of edges between at least one of the partitions and at least one of the channels according to the flexible spaces and the specific area path;

displaying a final floor plan according to the re-shaped partitions; and fabricating the integrated circuit according to a placement of the final floor plan and the re-routed nets, wherein each of the first tiles between the partition and the channel has a fixed tile property being the partition or the channel, and each of the second tiles has a changeable tile property which can be changed between the at least one partition and the at least one channel, wherein a distance between the first and second sides of the initial floor plan is greater than a distance between the first and side of the final floor plan.

12. The method as claimed in claim 11, wherein the step of re-shaping the partitions and re-routing the nets within the channels by using the second tiles further comprises:

changing the changeable tile properties of the second tiles from the at least one channel to the at least one partition according to the specific area path, to widen the at least one partition along a specific direction, and re-route the nets on the at least one channel so as to avoid the nets passing through the second tiles; and changing the changeable tile properties of the second tiles from the at least one partition to the at least one channel according to the specific area path, to narrow the at least one partition along the specific direction and re-route the nets on the at least one channel so as to increase the nets passing through the second tiles, wherein the specific direction is orthogonal to an edge between the at least one partition and the at least one channel.

13. The method as claimed in claim 11, wherein the second tiles are arranged in a specific range between the at least one partition and the at least one channel, and a center line of the specific range is an edge between the at least one partition and the at least one channel.

14. The method as claimed in claim 11, wherein the step of obtaining the specific area path from one side to the opposite side of the initial floor plan according to the partitions, the channels and the corresponding routing densities further comprises:

obtaining a plurality of path lengths of a plurality of area paths in the layout area according to the partitions, the channels and the corresponding routing densities; and obtaining the specific area path with a maximum path length among the path lengths of the area paths.

15. The method as claimed in claim 14, wherein the path length of each of the area paths is obtained by adding lengths of the channels multiplied by the corresponding routing densities and lengths of the partitions that the area path crosses.

16. The method as claimed in claim 15, wherein the maximum path length exceeds a chip size of the integrated circuit.

17. The method as claimed in claim 11, further comprising:

establishing a horizontal constraint graph and a vertical constraint graph according to a plurality of edges between the partitions and the channels so as to determine whether to use the second tiles.

18. The method as claimed in claim 11, wherein the partitions comprise at least one hard partition with a fixed shape and a plurality of soft partitions, wherein the soft partitions are movable and deformable, and the at least one partition is one of the soft partitions.

19. A non-transitory computer-readable storage medium storing instructions that, when executed by a computer, cause the computer to perform a method for minimizing a layout area of an integrated circuit, the method comprising:

obtaining and displaying an initial floor plan of the integrated circuit, wherein the initial floor plan comprises a plurality of partitions and a plurality of channels;

obtaining a plurality of first tiles of the initial floor plan according to the partitions and the channels, wherein each of the first tiles between the partition and the channel has a fixed tile property being the partition or the channel;

obtaining a plurality of second tiles around a plurality of edges between at least one of the partitions and at least one of the channels, wherein each of the second tiles has a changeable tile property which can be changed between the at least one partition and the at least one channel;

obtaining a specific area path from a first side to a second side of the initial floor plan according to the partitions, the channels and a plurality of routing densities corresponding to the channels;

changing the changeable tile properties of the second tiles according to the specific area path, to re-shape the partitions and re-route a plurality of nets within the channels; and obtaining a final floor plan according to the re-shaped partitions, wherein a distance between the first and second sides of the initial floor plan is greater than a distance between the first and side of the final floor plan.

20. The non-transitory computer-readable storage medium of claim 19, wherein the method further comprises:

routing the nets within the channels between the partitions via the first tiles so as to obtain each of the routing densities of the nets within each of the channels;

calculating flexible space according to the channels and the corresponding routing densities;

displaying the final floor plan according to the re-shaped partitions; and establishing a horizontal constraint graph and a vertical constraint graph according to a plurality of partitions so as to determine whether to change the changeable tile properties of the second tiles.

21. The non-transitory computer-readable storage medium of claim 19, wherein the step of changing the changeable tile properties of the second tiles according to the specific area path, to re-shape the partitions and re-route the nets of the channels further comprises:

changing the changeable tile properties of the second tiles from the at least one channel to the at least one partition, to widen the at least one partition along a specific direction, and re-route the nets on the at least one channel so as to avoid the nets passing through the second tiles; and changing the changeable tile properties of the second tiles from the at least one partition to the at least one channel, to narrow the at least one partition along the specific direction and re-route the nets on the at least one channel so as to increase the nets passing through the second tiles, wherein the specific direction is orthogonal to a boundary between the at least one partition and the at least one channel.

22. The non-transitory computer-readable storage medium of claim 19, wherein the second tiles are arranged in a specific range between the at least one partition and the at least one channel, and a center line of the specific range is a boundary between the at least one partition and the at least one channel.

23. The non-transitory computer-readable storage medium of claim 19, wherein the step of obtaining the specific area path with the maximum path length according to the partitions, the channels and the routing densities corresponding to the channels further comprises:

obtaining a plurality of path lengths of a plurality of area paths in the layout area according to the partitions, the channels and the routing densities; and obtaining the specific area path with a maximum path length among the path lengths of the area paths.

24. The non-transitory computer-readable storage medium of claim 23, wherein the path length of each of the area paths is obtained by adding lengths of the channels multiplied by the corresponding routing densities and lengths of the partitions that the area path crosses.

25. The non-transitory computer-readable storage medium of claim 23, wherein the maximum path length exceeds a chip size of the integrated circuit.

26. The non-transitory computer-readable storage medium of claim 19, wherein the partitions comprise at least one hard partition with a fixed shape and a plurality of soft partitions, wherein the soft partitions are movable and deformable, and the at least one partition is one of the soft partitions.

\* \* \* \* \*